UNITED STATES PATENT OFFICE.

EDWIN W. GROVE, OF ST. LOUIS, MISSOURI.

PREPARING MEDICINAL COMPOUNDS.

SPECIFICATION forming part of Letters Patent No. 609,342, dated August 16, 1898.

Application filed April 5, 1898. Serial No. 676,599. (No specimens.)

*To all whom it may concern:*

Be it known that I, EDWIN W. GROVE, of the city of St. Louis, State of Missouri, have invented certain new and useful Improvements in Processes for the Production of Tasteless Quinine, of which the following is a full, clear, and exact description.

My invention relates to a process for the production of tasteless quinine or derivatives of cinchona-bark in a powdered form that will enable the medicine to be easily administered in a dry condition without repugnance to the taste.

The object of my invention is the rendering or producing quinine in a powdered form, the same being tasteless, so that it can be administered dry on the tongue and followed by a swallow of water, thus doing away with pills and capsules. This method of producing quinine or derivatives of cinchona-bark in a tasteless condition and administering the same in a powdered form will fill a long-felt want in administering quinine to infants who cannot swallow pills or capsules and also to adults who object to pills and capsules. The finely-powdered tasteless quinine which I produce by the process hereinafter described when finished is tasteless because it is insoluble in the mouth (provided it is not held in the mouth longer than is necessary) and dissolves more readily in the stomach than does the sulfate of quinine when administered incased in capsules or sugar or gelatin coated pills.

In preparing my tasteless preparation of quinine I employ the following process: I take of quinine or any salt of quinia or an alkaloid of cinchona-bark three hundred ounces and paraffin-wax one-fourth the amount, by weight, or one hundred ounces. To the three hundred ounces of quinine I add a sufficient quantity of alcohol, ether, or other suitable liquid which will dissolve the same, and thus render the quinine thoroughly soluble. I take the soft paraffin-wax and dissolve it in the same manner. Thus far I have made two solutions—a solution of quinine and a solution of paraffin-wax. I put these two solutions together and thoroughly mix the same, and when the solutions are thoroughly mixed or united I apply a sufficient amount of heat by water-bath to evaporate the alcohol, ether, or other dissolvent agent used and continue this process until a perfectly dry and homogeneous mass is obtained. I then take the mass thus produced and reduce it to a fine powder, in which state the compound is ready for use.

By the above process I can render quinine, quinidia, cinchonidine, cinchonine, or any of the alkaloids of cinchona-bark or any of their salts, in connection with paraffin-wax, tasteless.

In carrying out my process I can use as a dissolving agent alcohol, ether, or any other liquid in which both the paraffin-wax and the quinine are soluble. In place of the paraffin-wax I can use any other substances which are insoluble in water and which will also make the quinine insoluble in the mouth, and therefore free from bitter taste.

While the wax, which is thoroughly united with the quinine to render it insoluble in the mouth, is less soluble in the stomach than gelatin, I have found by practical tests that the uniting of the quinine (which is very susceptible to the action of the acids in the stomach) renders the wax more soluble than gelatin in the stomach. One reason for this is that with the coated pill or capsule the stomach has only one large substance upon which to work, while by administering the compound above described in a fine powder it gives the stomach a large number of small particles upon which to act, thus rendering it more easy of digestion and assimilation than when given in capsules or pills. For the same reason calomel, an insoluble substance, is rendered more potent and more easily assimilated by triturating or reducing it to a very fine powder, thus giving the stomach a larger surface upon which to do its work.

The quinine, or an alkaloid of cinchona-bark, herein referred to, or any salts of the same may be dissolved and then united with paraffin-wax or other substances which are insoluble in water by other processes than the use of liquids.

I claim—

1. The herein-described process of producing tasteless quinine, which consists in dissolving a derivative of cinchona-bark, taking a substance insoluble in water and dissolving it, mixing and uniting said solutions, reducing said mixed solutions to a solid and homogeneous mass and reducing said mass to a finely-powdered form, substantially as specified.

2. The herein-described process of producing tasteless quinine, which consists in taking a derivative of cinchona-bark, as quinine, which has a bitter taste and applying to said quinine a liquid in which the same is soluble, taking a substance which is insoluble in water or is tasteless and applying to said substance a liquid in which the same is soluble, thus producing out of each of said quinine and substance a perfect solution, thoroughly mixing and uniting said solutions, applying heat to said united or mixed solutions to evaporate the dissolving liquid whereby a solid and homogeneous mass is produced and reducing said mass to a finely-powdered form, substantially as specified.

In testimony whereof I affix my signature in presence of two witnesses.

EDWIN W. GROVE.

Witnesses:
ZEBULON WEAVER,
W. H. LASATER, Jr.